(12) United States Patent
Kim et al.

(10) Patent No.: US 7,782,973 B2
(45) Date of Patent: Aug. 24, 2010

(54) APPARATUS AND METHOD FOR TRANSPORTING/RECEIVING DATA IN A CDMA MOBILE COMMUNICATION SYSTEM

(75) Inventors: Hun-Kee Kim, Seoul (KR); Yong-Suk Moon, Songnam-shi (KR); Jae-Seung Yoon, Songnam-shi (KR)

(73) Assignee: Samsung Electronics Co., Ltd (KR)

(*) Notice: Subject to any disclaimer, the term of this patent is extended or adjusted under 35 U.S.C. 154(b) by 1404 days.

(21) Appl. No.: 10/114,508

(22) Filed: Apr. 2, 2002

(65) Prior Publication Data

US 2003/0031233 A1    Feb. 13, 2003

(30) Foreign Application Priority Data

Apr. 4, 2001    (KR) .............. 2001-17925

(51) Int. Cl.
*H04L 27/00*    (2006.01)
(52) U.S. Cl. .................................... 375/295
(58) Field of Classification Search ........... 375/286, 375/295, 298, 308, 259, 260, 261; 370/366, 370/536, 66; 714/790, 756, 757, 758; 341/50, 341/81, 82, 80
See application file for complete search history.

(56) References Cited

U.S. PATENT DOCUMENTS

| | | | | |
|---|---|---|---|---|
| 3,909,721 A | * | 9/1975 | Bussgang et al. ........... | 375/280 |
| 4,630,231 A | * | 12/1986 | Hirata et al. ................. | 386/95 |
| 5,105,442 A | * | 4/1992 | Wei ............................ | 375/262 |
| 5,287,180 A | * | 2/1994 | White ......................... | 348/484 |
| 5,565,926 A | | 10/1996 | Bryan et al. | |
| 5,691,995 A | * | 11/1997 | Ikeda et al. ................. | 714/786 |
| 5,771,224 A | * | 6/1998 | Seki et al. .................... | 370/206 |
| 5,970,098 A | | 10/1999 | Herzberg | |
| 6,067,646 A | * | 5/2000 | Starr ........................... | 714/701 |
| 6,320,901 B1 | * | 11/2001 | Arad et al. ................... | 375/222 |
| 6,353,907 B1 | * | 3/2002 | van Nobelen ............... | 714/746 |
| 6,476,734 B2 | * | 11/2002 | Jeong et al. .................. | 341/50 |

(Continued)

FOREIGN PATENT DOCUMENTS

CA    2391905    3/2002

(Continued)

OTHER PUBLICATIONS

Sang Wu Park and Sang Wu Kim, "Transmission Power Allocation in Turbo Codes" VTC 2000-Spring Tokyo. 2000 IEEE 51st vol. 3, May 15-18, 2000 pp. 2073-2075 vol. 3.*

(Continued)

*Primary Examiner*—David C Payne
*Assistant Examiner*—Vineeta S Panwalkar
(74) *Attorney, Agent, or Firm*—The Farrell Law Firm, LLP (57) ABSTRACT

Disclosed is a data transportation/reception apparatus and method in a mobile communication system. The data transportation apparatus and method divides transport data bits into bits having higher priority and bits having lower priority, maps the bits having higher priority to bit positions having higher reliability, and maps the bits having lower priority to bit positions having lower reliability. The data reception apparatus and method demodulates received modulated symbols, divides the demodulated coded bits into two coded bit groups according to priority, deinterleaving the coded bit groups using different deinterleavers, and decodes the deinterleaved coded bits.

22 Claims, 8 Drawing Sheets

U.S. PATENT DOCUMENTS

| | | | |
|---|---|---|---|
| 2002/0057661 A1* | 5/2002 | Raith | 370/337 |
| 2002/0126763 A1* | 9/2002 | Jeong et al. | 375/295 |
| 2002/0163975 A1 | 11/2002 | Uesugi et al. | |
| 2003/0012295 A1 | 1/2003 | Matsumoto et al. | |

FOREIGN PATENT DOCUMENTS

| | | | |
|---|---|---|---|
| CN | 1406427 | | 3/2003 |
| EP | 0 485 108 | | 10/1991 |
| EP | 0 540 232 | | 10/1992 |
| EP | 1 043 858 | | 10/2000 |
| JP | 04-313983 | | 11/1992 |
| JP | 06-006399 | | 1/1994 |
| JP | 2000-068959 | | 3/2000 |
| JP | 2000-201132 | | 7/2000 |
| JP | EP 1043858 A 1 | * | 11/2000 |
| JP | 2002-164948 | | 6/2002 |
| JP | 2002-171298 | | 6/2002 |
| JP | 2002-199037 | | 7/2002 |
| WO | WO 99/34521 | | 7/1999 |

OTHER PUBLICATIONS

Panasonic, "Text Proposal for HARQ complexity evaluation section of TR25.848," TSG-RAN Working group 1 Meeting # 19, Las Vegas, USA, Feb. 27-Mar. 2, 2001, TSGR1#19(01)0206.*

Sandip Sakar, Brian Butler and Edward Tidemann, "Soft Handoff of the Quick Paging Channel, QUALCOMM," Global Telecommunication Conference—Globecom'99.*

T.M. Duman and M. Salehi, The Union Bound for Turbo Coded Modulation Systems Over Fading Channels, Global Telecommunications Conference—Globecom '99, 1999.

* cited by examiner

APPARATUS AND METHOD FOR TRANSPORTING/RECEIVING DATA IN A CDMA MOBILE COMMUNICATION SYSTEM

PRIORITY

This application claims priority to an application entitled "Apparatus and Method for Transporting/Receiving Data in a CDMA Mobile Communication System" filed in the Korean Industrial Property Office on Apr. 4, 2001 and assigned Serial No. 2001-17925, the contents of which are hereby incorporated by reference.

BACKGROUND OF THE INVENTION

1. Field of the Invention

The present invention relates generally to an apparatus and method for transporting/receiving data in a CDMA (Code Division Multiple Access) mobile communication system, and in particular, to a data transportation/reception apparatus and method for improving reliability of transport data bits.

2. Description of the Related Art

In a communication system, it is actually impossible to receive a transported signal without any distortions or noises. In particular, when the signal is transported/received over a wireless network, the effects of the distortions or noises are more serious as compared with when the signal is transported/received over a wired network.

Therefore, many efforts have been made to minimize the effects of the distortions or noises. An error control coding technique has been proposed as a typical method of minimizing the effects of the distortions or noises. Codes used for the error control coding technique are classified into a memoryless code and a memory code. For example, the memoryless code includes a linear block code, while the memory code includes a convolutional code and a turbo code. A device for generating such codes is called a "channel encoder", and its outputs can be divided into systematic bits and parity bits based on the error control coding technique. The turbo code is a code typically used for the error control coding technique that separates its outputs into the systematic bits and the parity bits. In addition to the turbo code, there exists a systematic convolutional code of the convolutional code, as a code used for the error control coding technique.

Herein, the "systematic bits" mean an actual transport signal, while the "parity bits" mean a supplemental signal added to correct a possible error which occurred during transportation in a decoding process. However, even though a signal is subjected to the error control coding, if a burst error occurs in the systematic bits or the parity bits, it is not easy to correct the burst error. Such a phenomenon frequently occurs while the signal passes through a fading channel, and an "interleaving" technique is typically used to prevent this phenomenon. The interleaving technique disperses a damaged part in several places rather than concentrating it on a single place, thereby complementing the error control coding technique.

Such interleaved signal is subject to mapping in a symbol unit in a digital modulator. The number of bits included in one symbol increases with the order of the modulator. Particularly, in the case of high-order modulation of over 16QAM (16-ary Quadrature Amplitude Modulation), one symbol includes information of over 4 bits, and the bits can be classified according to reliability. Here, the "reliability" can be represented by a probability that the bit values will be changed during transportation. For example, when one 16QAM-modualted symbol is subject to mapping on coordinates, information of leading two bits in the symbol has higher reliability since the leading two bits determine a quadrant of the coordinates, to which the symbol is to be mapped. This means that there is a lower probability that the information of the leading two bits will be changed during transportation. However, information of the remaining two bits in the symbol has lower reliability, since the remaining two bits determine one of the four regions obtained by dividing the determined quadrant. This means that there is a higher probability that the information of the remaining two bits will be changed during transportation. That is, of at least 3 bits included in one symbol, the bits determining a wider region have higher reliability and the bits determining a narrower region have lower reliability.

Figure 1:
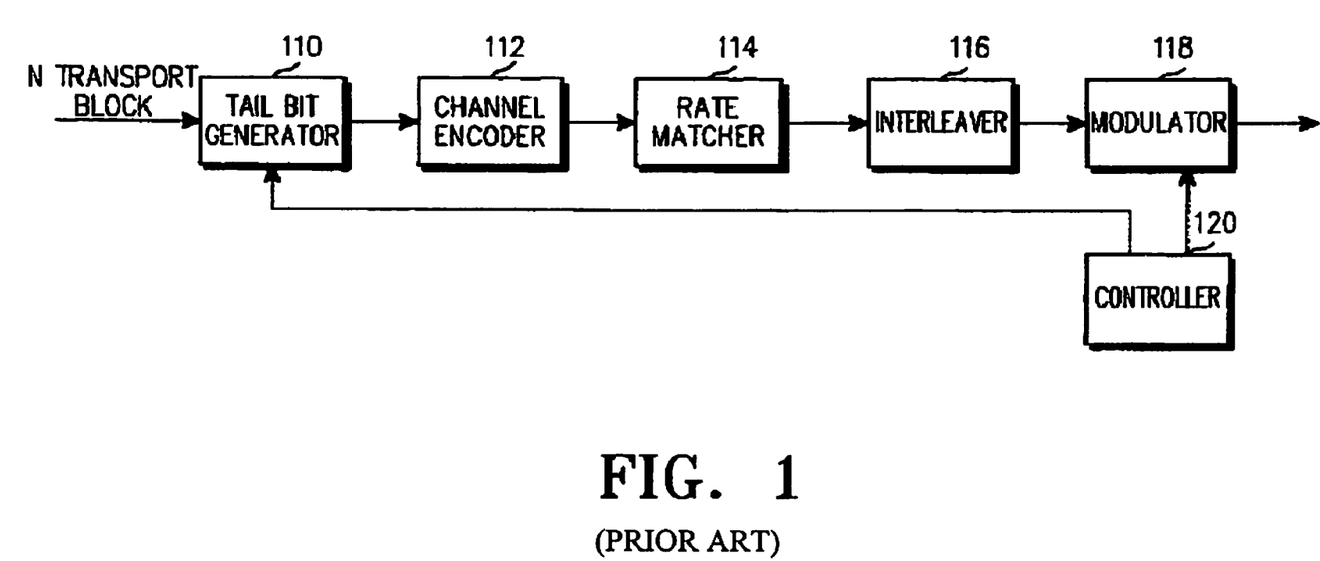
FIG. 1 illustrates a structure of a conventional transmitter in a CDMA communication system.

A transmitter of a common HSDPA (High-Speed Downlink Packet Access) radio communication system is comprised of a channel encoder, an interleaver and a modulator, as illustrated in FIG. 1.

Referring to FIG. 1, a tail bit generator 110 receives N transport blocks and adds associated tail bits to the respective transport blocks. A channel encoder 112 encodes the N tail bit-added transport blocks from the tail bit generator 110 and outputs coded symbols. The channel encoder 112 has at least one coding rate in order to encode the N transport blocks. The coding rate may be ½ or ¾. When the channel encoder 112 supports a plurality of coding rates through symbol puncturing or symbol repetition using a ⅙ or ⅕ mother encoder, an operation of selecting a coding rate from the available coding rates is required. In FIG. 1, the channel encoder 112 determines (selects) the coding rate under the control of a controller 120.

A rate matcher 114 rate-matches the coded symbols from the channel encoder 112. The rate matching is performed by repeating or puncturing the coded symbols, when a transport channel is subject to multiplexing or when the number of the output symbols of the channel encoder 112 is not identical to the number of symbols transported over a radio channel. An interleaver 116 interleaves the rate-matched coded symbols from the rate matcher 114. The interleaving is performed to minimize a possible data loss during transportation. An M-ary modulator 118 modulates the interleaved coded symbols by QPSK (Quadrature Phase Shift Keying), 8PSK (8-ary Phase Shift Keying), 16QAM or 64QAM modulation. The controller 120 controls an operation of the channel encoder (or turbo encoder) 112 and a modulation mode of the modulator 118 according to a current state of the radio channel. The HSDPA radio communication system uses AMCS (Adaptive Modulation and Coding Scheme) for the controller 120 in order to select the modulation modes (QPSK, 8PSK, 16QAM and 64QAM) according to the radio environment. Though not illustrated in the drawing, the CDMA mobile communication system spreads transport data using a Walsh code W and an orthogonal code PN, so that a corresponding mobile terminal (or UE (User Equipment)) can identify a channel and a base station (or Node B) transporting the data.

The structure of the transmitter has been described on the assumption that coded symbols are not divided into the systematic bits and the parity bits. However, the coded symbols output from the channel encoder 112 of the transmitter can be divided into the systematic bits and the parity bits. Of course, the systematic bits and the parity bits output from the channel encoder 112 have different priorities. Namely, in the case where errors occur in the transport data at a given rate, it is possible to perform relatively correct decoding when the errors occur in the parity bits rather than in the systematic bits. The reason is, as stated above, because the systematic bits are actual data bits while the parity bits are supplemental bits added to correct errors occurred during transportation in a decoding process.

However, the interleaver 116 of the conventional transmitter in the communication system performs interleaving regardless of the priorities of the systematic bits and the parity bits. That is, the conventional transmitter performs symbol mapping irrespective of the systematic bits and the parity bits.

Hence, the conventional radio communication system has a high error occurrence probability regardless of the priorities of the systematic bits and the parity bits, when transporting data over the wireless network. Accordingly, there is a need for a technique capable of reducing a probability that errors will occur in the systematic bits having higher priority than the parity bits, thereby improving system performance.

SUMMARY OF THE INVENTION

It is, therefore, an object of the present invention to provide a data transportation/reception apparatus and method for improving performance of a radio communication system.

It is another object of the present invention to provide a data transportation/reception apparatus and method having higher reliability in a radio communication system.

It is further another object of the present invention to provide a data transportation/reception apparatus and method for receiving bits having higher priority at a receiver having a higher reception probability in a radio communication system.

It is yet another object of the present invention to provide a data transportation/reception apparatus and method for mapping data bits to symbol bit positions having different reliabilities according to priorities of transport data bits.

It is still another object of the present invention to provide a data reception apparatus and method for receiving data bits mapped to symbol bit positions having different reliabilities according to priorities of transport data bits.

It is still another object of the present invention to provide a data transportation apparatus and method for mapping data bits having higher priority to symbol bit positions having higher reliability, and mapping data bits having lower priority to symbol bit positions having lower reliability.

It is still another object of the present invention to provide a data transportation apparatus and method for mapping systematic bits to symbol bit positions having higher reliability and parity bits to symbol bit positions having lower reliability.

To achieve the above and other objects, the present invention provides a data transportation apparatus and method for dividing transport data bits into bits having higher priority and bits having lower priority, mapping the bits having higher priority to symbol bit positions having higher reliability, and mapping the bits having lower priority to symbol bit positions having lower reliability.

Further, the present invention provides a data reception apparatus and method for demodulating received modulated symbols, dividing the demodulated coded bits into two coded bit groups according to priority, deinterleaving the coded bit groups using different deinterleavers, and decoding the deinterleaved coded bits.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, it will be assumed that the channel encoder supports a coding rate of ½ and ¾, and the modulator supports QPSK, 8PSK, 16QAM and 64QAM. Shown in Table 1 are available encoding operations according to an embodiment of the present invention, when the assumption stated above is applied.

TABLE 1

| Coding Rate | Modulation Mode |
|---|---|
| ½ | QPSK |
|  | 8PSK |
|  | 16QAM |
|  | 64QAM |
| ¾ | QPSK |
|  | 8PSK |
|  | 16QAM |
|  | 64QAM |

At the ½ coding rate (symmetric coding rate), the channel encoder outputs 2 bits by receiving one input bit. One of the 2 output bits is an actual data bit, a systematic bit, while the remaining one bit is a parity bit for detecting and compensating for an error. However, at the ¾ coding rate (asymmetric coding rate), the channel encoder outputs 4 bits by receiving 3 input bits. The 4 output bits are divided into 3 systematic bits and one parity bit.

A symbol pattern based on the 16QAM can be expressed as [H,H,L,L], and a symbol pattern based on the 64QAM can be expressed as [H,H,M,M,L,L]. In the symbol patterns, "H" represents a bit position having High reliability, "L" represents a bit position having Low reliability, and "M" represents a bit position having Medium reliability. The present invention aims at mapping the bits having relatively higher priority (e.g., systematic bits and tail bits) to the bit positions having higher reliability, and mapping the bits having relative lower priority (e.g., parity bits and tail parity bits) to the bit positions having lower reliability, in performing symbol mapping on the coded bits according to a predetermined symbol pattern.

Now, reference will be made to symbol mapping methods based on the ½ and ¾ coding rates and the 16QAM and 64QAM modulations according to an embodiment of the present invention.

First, when using the ½ coding rate and the 16QAM modulation, the transmitter maps 2 systematic bits to the 2 H-bit positions in the symbol pattern, and maps 2 parity bits to the 2 L-bit positions in the symbol pattern. In this case, it is preferable to use an interleaver with a fixed length.

Second, when using the ¾ coding rate and the 16QAM modulation, the transmitter can use either an interleaver with a fixed length or an interleaver with a variable length. When the interleaver with a fixed length is used, the interleaver for interleaving systematic bits is identical in length to the interleaver for interleaving parity bits. However, when the interleaver with a variable length is used, the interleaver for interleaving systematic bits may not be identical in length to the interleaver for interleaving parity bits.

When using the interleaver with a fixed length, the transmitter maps the first 2 systematic bits to the 2 H-bit positions in the symbol pattern after interleaving, and maps the remaining 1 systematic bit and 1 parity bit to the 2 L-bit positions in the symbol pattern after interleaving. Therefore, when the interleaver has a fixed length, a separate structure for matching the numbers of input bits to the respective interleavers is required. Although the description has been made of an example where the coded bits are subject to interleaving in a unit of 2 bits, this may be varied depending on a length of the interleaver. That is, although the present invention will be described with reference to an example where the coded bits are subjected to interleaving in a unit of 2 bits, it would be obvious to those skilled in the art that the coded bits may be subjected to interleaving in units of 4 or 8 bits.

However, when using the interleaver with a variable length, the transmitter varies a length of the interleaver according to the number of the systematic bits and the number of the parity bits. That is, the transmitter interleaves 3 systematic bits and maps them to the 2 H-bit positions and the 1 H-bit position in the symbol pattern. Further, the transmitter maps 1 parity bit to the remaining 1 L-bit position in the symbol pattern. Although the description has been made of an example where the 2 systematic bits and the 1 parity bit are subject to interleaving, the number of the bits subjected to interleaving may be varied depending on a length of the interleaver. That is, when a length of the interleaver is 8, the coded bits may be subject to interleaving in a unit of 8 bits.

Third, when using the ½ coding rate and the 64 QAM modulation, the transmitter maps 2 systematic bits to the 2 H-bit positions in the symbol pattern, and maps the remaining 1 systematic bit to the 1 M-bit position in the symbol pattern. Further, the transmitter maps 2 parity bits to the 2 L-bit positions in the symbol pattern and maps the remaining 1 parity bit to the remaining 1 M-bit position in the symbol pattern. In this case, it is preferable to use an interleaver with a fixed length.

Fourth, when using the ¾ coding rate and the 64QAM modulation, the transmitter may use either an interleaver with a fixed length or an interleaver with a variable length. When using the interleaver with a fixed length, transmitter determines a ratio of the systematic bits to the parity bits such that as many systematic bits as possible may be mapped to the bit positions having higher reliability in the symbol pattern.

First Embodiment

Figure 2:
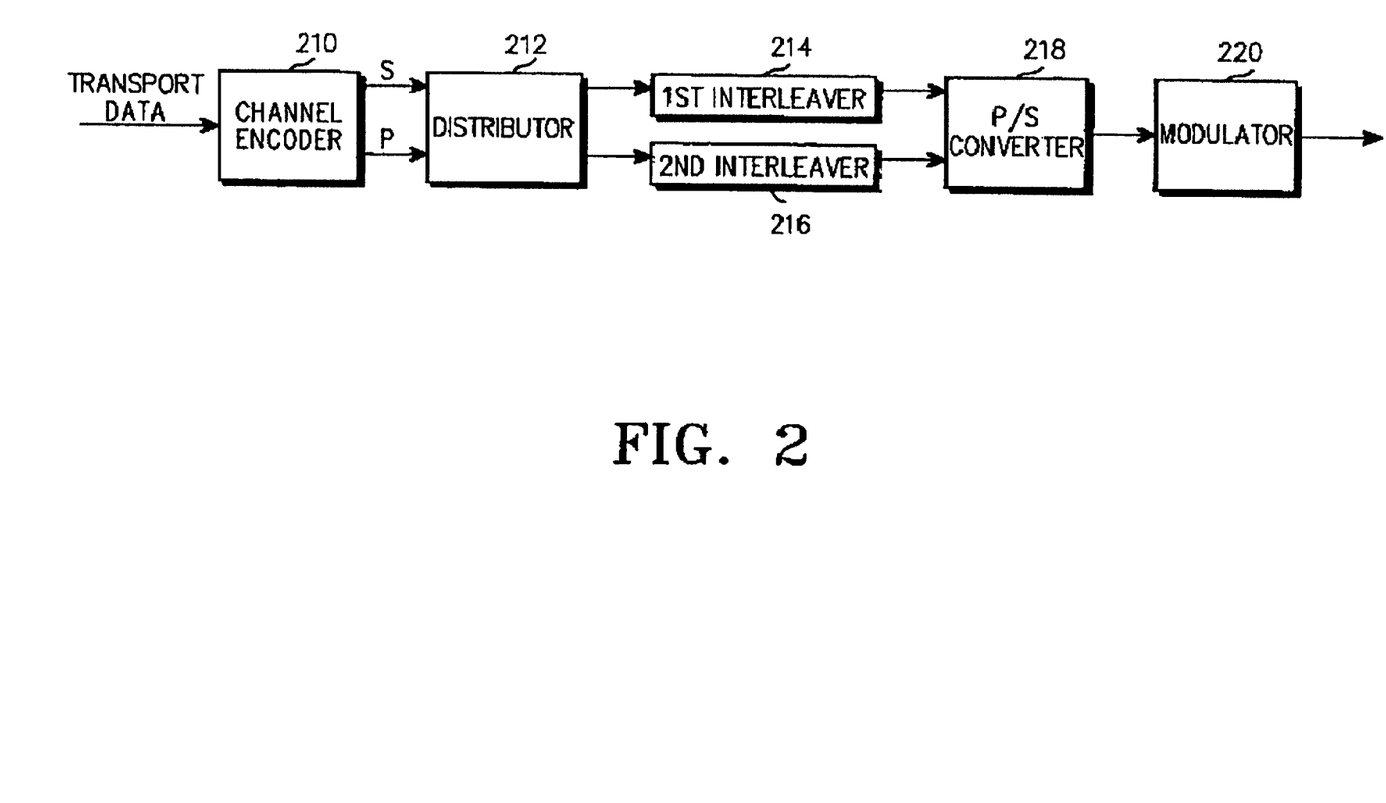
FIG. 2 illustrates a structure of a transmitter in a CDMA mobile communication system according to a first embodiment of the present invention.

FIG. 2 illustrates a structure of a transmitter in a CDMA mobile communication system according to a first embodiment of the present invention. Referring to FIG. 2, a channel encoder 210 receives transport data and encodes the received transport data using a predetermined code. The predetermined code refers to a code for outputting transport bits and error control bits of the transport bits, obtained by encoding the received data. For example, the transport bits are systematic bits (S), and the error control bits are parity bits (P). The predetermined code includes a turbo code and a systematic convolutional code, as mentioned above.

A distributor 212 receives the systematic bits and the parity bits from the channel encoder 210, and distributes the systematic bits and the parity bits to a plurality of interleavers. For example, when there exist two interleavers 214 and 216, the distributor 212 distributes the systematic bits and the parity bits into two bit groups having the same number of bits. For example, when the ¾ coding rate and the 16QAM modulation are used, the distributor 212 distributes the 2 S bits to the first interleaver 214, and distributes the remaining 1 S bit and the 1 P bit to the second interleaver 216. As a result, one of two bit groups (or bit streams) is provided to the first interleaver 214, while the other bit group is provided to the second interleaver 216. However, when the transmitter uses a systematic coding rate such as ½ coding rate, the distributor 212 is not essential in the first embodiment. The reason is because when the ½ symmetric coding rate is used, the number of systematic bits is identical to the number of parity bits, and thus the systematic bits are provided to the first interleaver 214 and the parity bits are provided to the second interleaver 216. The distributor 212 is also not essential even when the first and second interleavers 214 and 216 support a variable length, although they use an asymmetric coding rate such as ¾ coding rate. That is, the distributor 212 is essential only when the first and second interleavers 214 and 216 support the asymmetric coding rate and the fixed length.

The first and second interleavers 214 and 216 receive the coded bits from the distributor 212 or the channel encoder 210, and interleave the received coded bits. The coded bits, may be the systematic bits, the parity bits, or a mixture of the systematic bits and the parity bits. When the received coded bits are the mixed bits of the systematic bits and the parity bits, the distributor 212 is essential. In this case, an interleaver receiving the mixture of the systematic bits and the parity bits rearrange the coded bits such that the systematic bits having higher priority always exist in specific positions, before interleaving. This assists the receiver in performing a decoding operation, and the specific positions of the systematic bits are previously notified to the receiver by the transmitter.

The sum of a length of the first interleaver 214 and a length of the second interleaver 216 are a value that can be divided by 2 (for QPSK), 3 (for 8PSK), 4 (for 16QAM) and 6 (for 64QAM). As an example of this condition, when the total length $L_{tot}$ of the interleavers is 144 bits, the following condition is satisfied.

$$L_{tot}=L_{sys}+L_{par}=144 \quad (1)$$

where $L_{sys}$ represents a length of the first interleaver and $L_{par}$ represents a length of the second interleaver.

Figure 6:
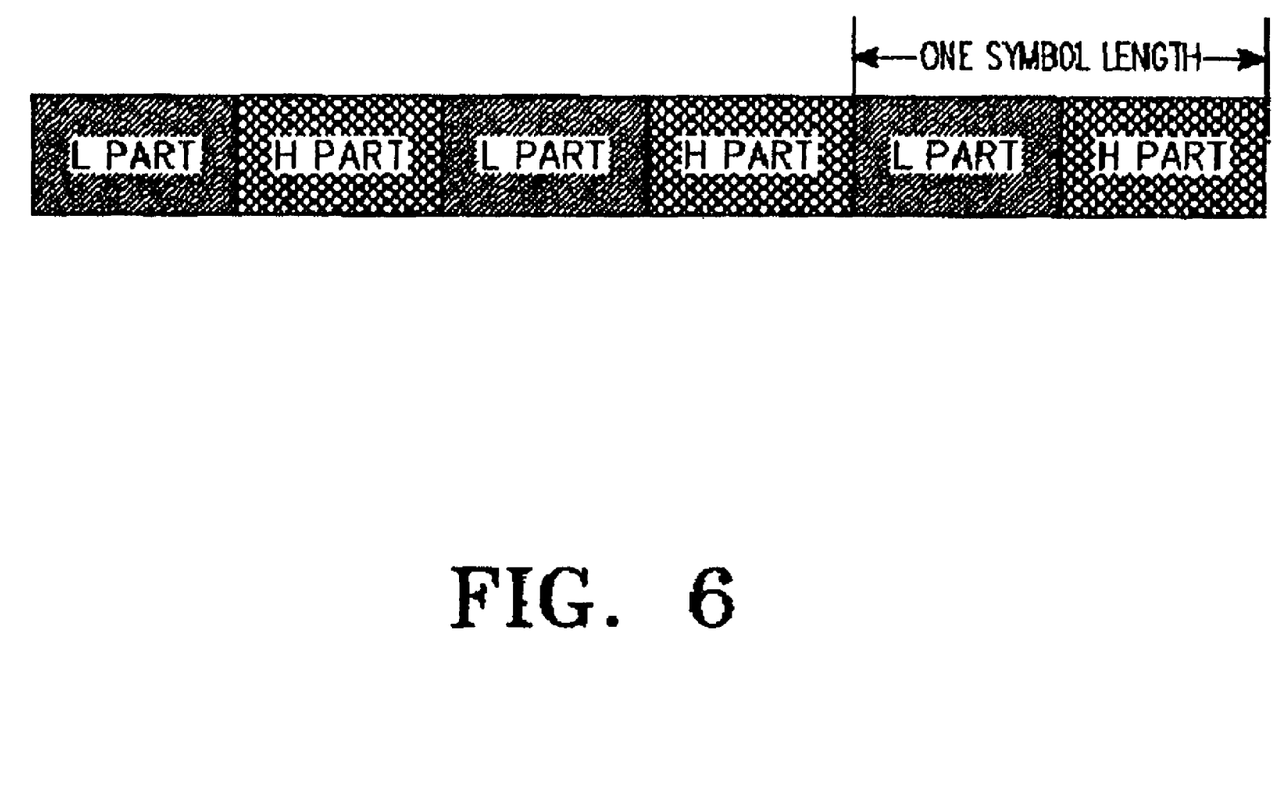
FIG. 6 illustrates an output format of the P/S converter in the transmitter according to an embodiment of the present invention.

A parallel-to-serial (P/S) converter 218 receives in parallel the interleaved coded bits output from the first interleaver 214 and the interleaved coded bits output from the second interleaver 216, and outputs the received coded bits in series. For example, when the coded bits having the higher priority are interleaved by the first interleaver 214 and the coded bits having the lower priority are interleaved by the second interleaver 216, the P/S converter 218 first outputs the coded bits received from the first interleaver 214 and then outputs the coded bits received from the second interleaver 216. This is to map the systematic bits having the higher priority to the bit positions having the higher reliability in a succeeding modulation process. An output format of the P/S converter 218 is illustrated in FIG. 6. In FIG. 6, "H Parts" represent the bits having higher priority, while "L Parts" represent the bits having lower priority. The H parts and the L parts are symmetrical for the interleaver with a fixed length, and asymmetrical for the interleaver with a variable length.

A modulator 220 symbol-maps the coded bits from the P/S converter 218 according to a predetermined symbol pattern, and transports the symbol-mapped coded bits to the receiver. For example, when the modulator 220 uses the 16QAM modulation, the coded bits are subject to symbol mapping according to the symbol pattern [H,H,L,L]. However, when the modulator 220 uses the 64QAM modulation, the coded bits are subject to symbol mapping according to the symbol pattern [H,H,M,M,L,L].

Though not illustrated in FIG. 2, a transmitter in the CDMA mobile communication system may further include a rate matcher for performing rate matching by repeating and puncturing the coded bits from the channel encoder 210.

Figure 3:
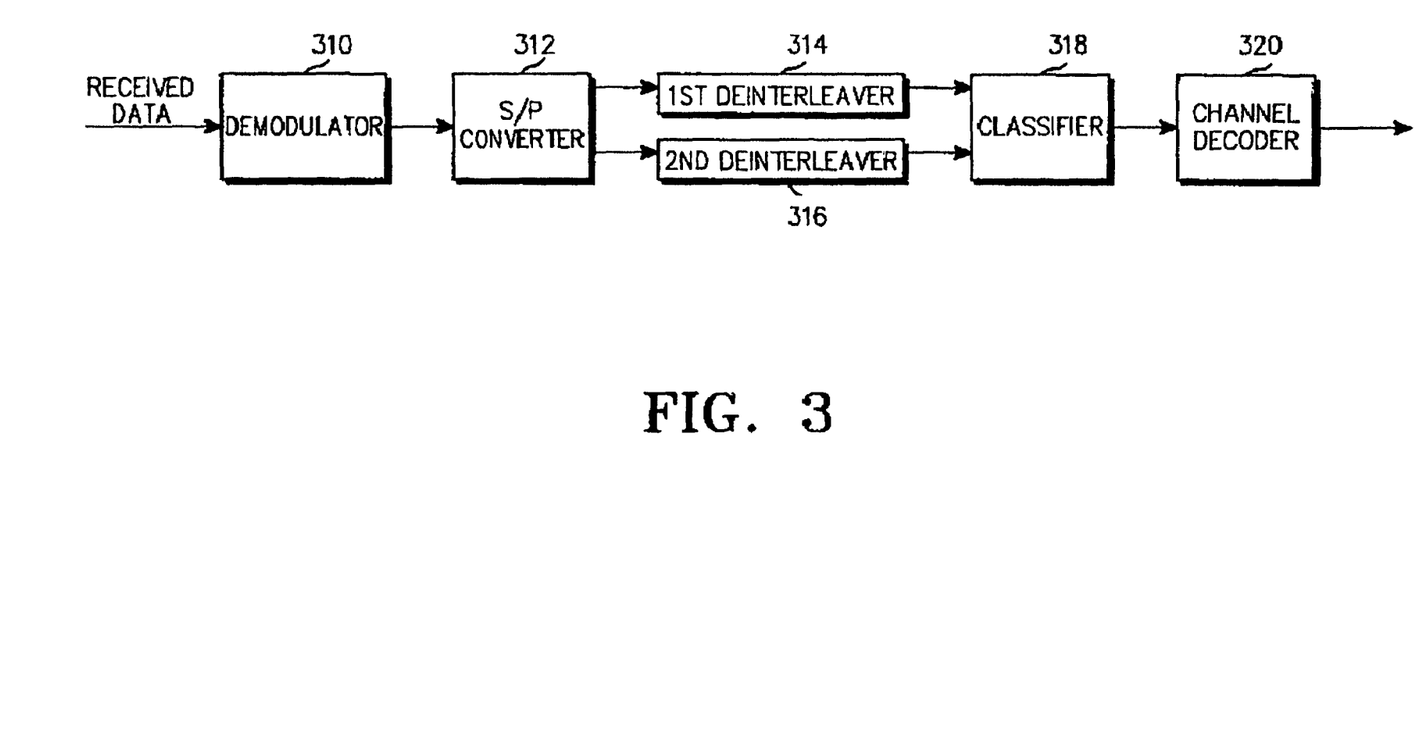
FIG. 3 illustrates a structure of a receiver according to a first embodiment of the present invention.

FIG. 3 illustrates a structure of a receiver according to a first embodiment of the present invention. The receiver corresponds to the transmitter of FIG. 2. Referring to FIG. 3, a demodulator 310 receives data transported from the transmitter, and demodulates the received data according to a demodulation mode corresponding to the modulation mode used by the modulator 220 of the transmitter.

A serial-to-parallel (S/P) converter 312 receives in series the demodulated coded bits from the demodulator 310, and outputs in parallel the received coded bits by switching. For example, when the modulator 220 in the transmitter uses the 16QAM modulation, the S/P converter 312 outputs first 2 bits to a first deinterleaver 314 and the next 2 bits to a second deinterleaver 316, by switching the coded bits in a 2-bit unit. When the modulator 220 in the transmitter uses the 64QAM modulation, the S/P converter 312 outputs first 3 bits to the first deinterleaver 314 and the next 3 bits to the second deinterleaver 316, by switching the coded bits in a 3-bit unit. However, when the transmitter uses an asymmetric coding rate and interleavers having a variable length, the S/P converter 312 recognizes the variable length based on previously received information. In this manner, the S/P converter 312 outputs as many coded bits as a length of the first interleaver 214 in the transmitter to the first deinterleaver 314, and outputs as many coded bits as a length of the second interleaver 216 in the transmitter to the second deinterleaver 316.

The first and second deinterleavers 314 and 316 deinterleave the coded bits provided from the S/P converter 312. Operations of the first and second deinterleavers 314 and 316 correspond to operations of the first and second interleavers 214 and 216 in the transmitter. That is, since the first and second deinterleavers 314 and 316 (based on a prior storage and/or exchange of information) recognize the interleaving patterns performed by the first and second interleavers 214 and 216 of the transmitter, the same interleaving pattern is pre-arranged for the transmitter and the receiver. For example, the transmitter may previously inform the receiver of the interleaving pattern information as system information before call setup.

A classifier 318 classifies the deinterleaved coded bits provided from the first and second deinterleavers 314 and 316. The coded bits may be systematic bits, parity bits or a mixture of the systematic bits and the parity bits. When the coded bits are the mixed bits of the systematic bits and the parity bits, the classifier 318 is an essential element. In this case, among the coded bits output from a deinterleaver for deinterleaving the mixed bits of the systematic bits and the parity bits, the systematic bits having higher priority will always exist in specific positions. By prior arrangement, the transmitter and the receiver will agree on the positions of the systematic bits, analogous to the interleaving pattern information. For example, the transmitter may previously inform the receiver of the systematic bit position information as system information. For example, when the coded bits having higher priority are deinterleaved by the first deinterleaver 314 and the coded bits having lower priority are deinterleaved by the second deinterleaver 316, the classifier 318 may first output the deinterleaved coded bits from the first deinterleaver 314 and then output the deinterleaved coded bits from the second deinterleaver 316. However, the classifier 318 is not an essential element when the transmitter uses the symmetric coding rate such as ½ coding rate.

A channel decoder 320 receives the coded bits from the classifier 318 or the coded bits from the first and second deinterleavers 314 and 316, and decodes the received coded bits according to a predetermined decoding method, thereby outputting desired decoded bits. For the predetermined decoding method, a method for receiving systematic bits and parity bits and then decoding the systematic bits is used, and the decoding method is determined based on the encoding method of the transmitter.

Operations of the first embodiment of the present invention will be described in detail herein below with reference to FIGS. 2 and 3.

First, operations of the transmitter will be described in detail with reference to FIG. 2. Operations of the transmitter according to the first embodiment of the present invention can be divided into three operations depending on the coding rate and whether the transmitter uses interleavers with a fixed length or interleavers with a variable length. The three operations include (1) a first operation where the transmitter uses the symmetric coding rate, (2) a second operation where the transmitter uses the asymmetric coding rate and the interleavers with a fixed length, and (3) a third operation where the transmitter uses the asymmetric coding rate and the interleavers with a variable length. A detailed description of the three operations according to the first embodiment of the present invention will be given below.

First Operation (Transmitter)

An operation of the transmitter using the symmetric coding rate will be described in detail below. Transport data is provided to the channel encoder 210 where it is encoded by a specific code. That is, the channel encoder 210 outputs systematic bits (S bits), which are actual transport data, and parity bits (P bits) for error controlling of the transport data, through encoding. For example, when the channel encoder 210 uses the symmetric coding rate such as ½ coding rate, it outputs the S bits and the P bits in the same ratio. The S bits provided from the channel encoder 210 are provided to the first interleaver 214, while the P bits provided from the channel encoder 210 are provided to the second interleaver 216.

Therefore, the S bits are interleaved by the first interleaver 214 and the P bits are interleaved by the second interleaver 216. The interleaving pattern of the first and second interleavers 214 and 216 is previously determined, and by pre-arrangement the determined interleaving pattern is recognized by the receiver.

The interleaved S and P bits from the first and second interleavers 214 and 216 are provided in parallel to the P/S converter 218. The interleaved S bits and P bits provided in parallel to the P/S converter 218 are output in series. Preferably, the P/S converter 218 first outputs a predetermined number of the interleaved S bits and then outputs a predetermined number of the interleaved P bits.

The interleaved S and P bits from the P/S converter 218 are provided to the modulator 220 where they are subject to symbol mapping according to the predetermined symbol pattern and then transmitted to the receiver of FIG. 3. For example, when the modulation mode of the modulator 220 is 16QAM, the predetermined symbol pattern is defined as [H,H,L,L]. Therefore, the modulator 220 maps the 2 interleaved S bits to the H-bit positions in the symbol pattern and the 2 interleaved P bits to the L-bit positions in the symbol pattern, and then the symbol-mapped bits are transmitted to the receiver. However, when the modulation mode of the modulator 220 is 64QAM, the predetermined symbol pattern is defined as [H,H,M,M,L,L]. Therefore, the modulator 220 maps 3 interleaved S bits to 2 H-bit positions and 1 M-bit position in the symbol pattern, and maps 3 interleaved P bits to the remaining 1 M-bit position and 2 L-bit positions in the symbol pattern. The symbol-mapped bits are then transmitted to the receiver.

First Operation (Receiver)

An operation of the receiver using the symmetric coding rate will be described in detail below. Data received from the transmitter is provided to the demodulator 310 where the received data is demodulated in coded bits according to a demodulation mode corresponding to the modulation mode used by the modulator 220 of the transmitter. The demodulated coded bits from the demodulator 310 are provided in series to the S/P converter 312, and the S/P converter 312 outputs the received coded bits in parallel. For example, when the modulator 220 of the transmitter uses 16QAM modulation, the S/P converter 312 outputs the first 2 bits to the first deinterleaver 314 and the next 2 bits to the second deinterleaver 316. However, when the modulator 220 of the transmitter uses 64QAM modulation, the S/P converter 312 outputs the first 3 bits to the first deinterleaver 314 and the next 3 bits to the second deinterleaver 316.

The coded bits from the S/P converter 312 are classified into two bit groups, and the classified bit groups are provided to the first and second deinterleavers 314 and 316, where the bit groups are subject to deinterleaving. The deinterleaving operations of the first and second deinterleavers 314 and 316 correspond to the interleaving operations performed by the first and second interleavers 214 and 216 of the transmitter. That is, the first and second deinterleavers 314 and 316 perform deinterleaving according to the interleaving pattern performed by the first and second interleavers 214 and 216 of the transmitter.

The deinterleaved coded bits from the first and second deinterleavers 314 and 316 are provided to the decoder 320 where the coded bits are decoded into desired received bits according to a predetermined decoding method. For the predetermined decoding method, a method for receiving S bits and P bits and then decoding the S bits is used, and the decoding method is determined based on the encoding method of the transmitter.

Second Operation (Transmitter)

An operation of the transmitter using the asymmetric coding rate and the interleavers with a fixed length will be described in detail below. Transport data is provided to the channel encoder 210 where it is encoded by a specific code. That is, the channel encoder 210 outputs systematic bits (S bits), which are actual transport data, and parity bits (P bits) for error controlling of the transport data, through encoding. For example, when the channel encoder 210 uses the asymmetric coding rate such as ¾ coding rate, it outputs the S bits and the P bits in a ratio based on the ¾ coding rate. That is, the channel encoder 210 outputs 3 S bits and 1 P bit.

The S bits and the P bits from the channel encoder 210 are provided to the distributor 212 where they are divided into two bit groups in the same ratio. That is, when 16QAM modulation is used, the distributor 212 provides 2 S bits to the first interleaver 214, and provides the remaining 1 S bit and 1 P bit to the second interleaver 216.

A description will be made as to how the distributor 212 operates in two possible cases. In a first case where the number of the systematic bits is larger than the number of the parity bits, the distributor 212 fills the first interleaver 214 with the systematic bits, and fills the second interleaver 216 with the remaining systematic bits along with the parity bits. In a second case where the number of the systematic bits is less than the number of the parity bits, the distributor 212 fills the first interleaver 214 with the systematic bits, fills the remaining part of the first interleaver 214 with parity bits, and fills the second interleaver 216 with the remaining parity bits.

Therefore, the 2 S bits are interleaved by the first interleaver 214, and the remaining 1 S bit and the 1 P bit are interleaved by the second interleaver 216. The interleaving pattern of the first and second interleavers 214 and 216 is previously set, and the same interleaving pattern is previously set in the receiver. Further, provided with the S bit and the P bit from the distributor 212, the second interleaver 216 determines the S bit position before interleaving based on a previously determined pattern that is the same as the receiver, so that the receiver can efficiently classify the S bit and the P bit in the decoding process. For example, the S bit to be interleaved by the second interleaver 216 is located in a front position before interleaving, so that the receiver can estimate a bit located in the front position as the S bit after deinterleaving.

The S bits interleaved by the first interleaver 214, and the S bit and the P bit interleaved by the second interleaver 216 are provided in parallel to the P/S converter 218. The P/S converter 218 outputs in series the provided interleaved S bits and P bit and the provided interleaved S bit and P bit. Preferably, the P/S converter 218 first outputs the output bits of the first interleaver 214 and then outputs the output bits of the second interleaver 216.

The interleaved S bits and the interleaved S bit and P bit from the P/S converter 218 are provided to the modulator 220 where they are subject to symbol mapping according to the predetermined symbol pattern and then are transmitted to the receiver of FIG. 3. For example, when the modulation mode of the modulator 220 is 16QAM, the predetermined symbol pattern is defined as [H,H,L,L]. Therefore, the modulator 220 maps the 2 interleaved S bits to the H-bit positions in the symbol pattern and the 2 interleaved bits of the S bit and the P bit to the L-bit positions in the symbol pattern, and the symbol-mapped bits are then transmitted to the receiver. However, when the modulation mode of the modulator 220 is 64QAM, the predetermined symbol pattern is defined as [H,H,M,M,L,L]. Therefore, the modulator 220 maps 3 S bits interleaved by the first interleaver 214 to 2 H-bit positions and 1 M-bit position in the symbol pattern, and maps 3 P bits interleaved by the second interleaver 216 to the remaining 1 M-bit position and 2 L-bit positions in the symbol pattern. The symbol-mapped bits are then transmitted to the receiver.

In this case, since the two interleavers have a fixed size, it is not necessary to vary the length of the interleavers according to the coding rate. Thus, it is simple to implement the interleavers. However, when there exist three or more reliability levels as in the high order modulation of over 64QAM, there is a case where an optimal condition is not satisfied. The "optimal condition" refers to a condition in which the bits having higher priority are always mapped to the bit positions having higher reliability. In the optimal condition, if the number of the S bits is larger than the number of P bits, the remaining S is provided to the second interleaver and then interleaved along with the P bit. Accordingly, though the S bits interleaved by the first interleaver 214 are mapped to the bit positions having the higher reliability, the S bit provided to the second interleaver 216 may be mapped to the bit position having lower reliability. To avoid this, it is possible to increase the number of interleavers to cover the 3 different reliability levels. Increasing the number of the interleavers is mere extension of the present invention, so the detailed description will not be given in order not to obscure the gist of the present invention. However, even the transmitter using the two interleavers with a fixed length demonstrates better performance than the conventional transmitter.

Second Operation (Receiver)

An operation of the receiver using the asymmetric coding rate and the interleavers with a fixed length will be described in detail below. Data received from the transmitter is provided to the demodulator 310 where the received data is demodulated in coded bits according to a demodulation mode corresponding to the modulation mode used by the modulator 220 of the transmitter. The demodulated coded bits from the demodulator 310 are provided in series to the S/P converter 312, and the S/P converter 312 outputs the received coded bits in parallel. For example, when the modulator 220 of the transmitter uses 16QAM modulation, the S/P converter 312 outputs the first 2 bits to the first deinterleaver 314 and the next 2 bits to the second deinterleaver 316. In this case, the first 2 bits are comprised of only the systematic bits, and the next 2 bits are comprised of an S bit and a P bit. However, when the modulator 220 of the transmitter uses 64QAM modulation, the S/P converter 312 outputs the first 3 bits to the first deinterleaver 314 and the next 3 bits to the second deinterleaver 316.

The coded bits from the S/P converter 312 are classified into two bit groups, and the classified bit groups are provided to the first and second deinterleavers 314 and 316, where the bit groups are subject to deinterleaving. The deinterleaving operations of the first and second deinterleavers 314 and 316 correspond to the interleaving operations performed by the first and second interleavers 214 and 216 of the transmitter. That is, the first and second deinterleavers 314 and 316 perform deinterleaving according to the interleaving pattern performed by the first and second interleavers 214 and 216 of the transmitter.

The deinterleaved coded bits from the first and second deinterleavers 314 and 316 are provided to the classifier 318 where the coded bits are classified into the S bits and the P bits. As the output bits of the second deinterleaver 316 are mixed bits of the S bit and the P bits, by pre-arrangement along with the transmitter, the classifier 318 recognizes the position where the S bit among the deinterleaved bits exists.

The coded bits from the classifier 318 are provided to the decoder 320 where the coded bits are decoded into desired received bits according to a predetermined decoding method. For the predetermined decoding method, a method for receiving S bits and P bits and then decoding the S bits is used. The decoding method is determined based on the encoding method of the transmitter.

Third Operation (Transmitter)

An operation of the transmitter using the asymmetric coding rate and the interleavers with a variable length will be described in detail below. Transport data is provided to the channel encoder 210 where it is encoded by a specific code. That is, the channel encoder 210 outputs systematic bits (S bits), which are actual transport data, and parity bits (P bits) for error controlling of the transport data, through encoding. In this example, when the channel encoder 210 uses the asymmetric coding rate such as ¾ coding rate, it outputs the S bits and the P bits in a different ratio based on the ¾ coding rate. That is, the channel encoder 210 outputs 3 S bits and 1 P bit. The S bits from the channel encoder 210 are provided to the first interleaver 214, and the P bits from the channel encoder 210 are provided to the second interleaver 216.

Therefore, the S bits are interleaved by the first interleaver 214, and the P bits are interleaved by the second interleaver 216. The interleaving pattern and length of the first and second interleavers 214 and 216 are previously determined, and the determined interleaving pattern and length are by pre-arrangement also recognized by the receiver. The length can be determined based on a ratio of the S bits to the P bits.

The interleaved S bits and P bits from the first and second interleavers 214 and 216 are provided in parallel to the P/S converter 218. The P/S converter 218 outputs the provided interleaved S bits and P bits in series. Preferably, the P/S converter 218 outputs the interleaved S bits and P bits such that the interleaved S bits are mapped to the bit positions having higher reliability.

The interleaved S bits and the interleaved P bits from the P/S converter 218 are provided to the modulator 220 where they are mapped to predetermined bit positions and then transmitted to the receiver of FIG. 3. For example, when a length of the first interleaver 214 receiving the S bits is 18 bits long and a length of the second interleaver 216 receiving the P bits is 6 bits long, a symbol mapping operation performed by the modulator 220 is as follows.

First, when the modulation mode of the modulator 220 is 16QAM, the predetermined symbol pattern is defined as [H,H,L,L]. Therefore, the modulator 220 maps the 2 interleaved S bits to the H-bit positions in the symbol pattern, maps the remaining 1 S bit and 1 P bit to the L-bit positions in the symbol pattern, and then transmits the symbol-mapped bits to the receiver.

Next, when the modulation mode of the modulator 220 is 64QAM, the predetermined symbol pattern is defined as [H,H,M,M,L,L]. Therefore, in a first modulation process, the modulator 220 symbol-maps the S bits and the P bits according to the symbol pattern in a ratio of 4:2. In a second modulation process, the modulator 220 symbol-maps the S bits and the P bits according to the symbol pattern in a ratio of 5:1. In a third modulation process, the modulator 220 symbol-maps the S bits and the P bits according to the symbol pattern in a ratio of 4:2. In a fourth modulation process, the modulator 220 symbol-maps the S bits and the P bits according to the symbol pattern in a ratio of 5:1. That is, in the first and third modulation processes where the ratio of the S bits to the P bits is 4:2, the modulator 220 maps the 2 S bits to the 2 H-bit positions in the symbol pattern, maps the remaining 2 S bits to the 2 M-bit positions in the symbol pattern, and maps the 2 P bits to the 2 L-bit positions in the symbol pattern. The symbol-mapped bits are then transmitted to the receiver. In the second and fourth modulation processes where the ratio of the S bits to the P bits is 5:1, the modulator 220 maps the 2 S bits to the 2 H-bit positions in the symbol pattern, maps the remaining 2 S bits to the 2 M-bit positions in the symbol pattern, and maps the last 1 S bit and the 1 P bit to the 2 L-bit positions in the symbol pattern. The symbol-mapped bits are then transmitted to the receiver.

Shown in Table 2 are the modulation processes performed by the transmitter using the asymmetric coding rate and the 64QAM modulation.

TABLE 2

|  | H | H | M | M | L | L |
|---|---|---|---|---|---|---|
| $1^{st}$ Modulation | S | S | S | S | P | P |
| $2^{nd}$ Modulation | S | S | S | S | S | P |
| $3^{rd}$ Modulation | S | S | S | S | P | P |
| $4^{th}$ Modulation | S | S | S | S | S | P |

When the length of the interleavers is varied as described above, it is necessary to disadvantageously control the size (length) of the two interleavers according to the coding rate. It is nonetheless possible to perform symbol mapping in an optimal condition regardless of the coding rate and the order of the modulator. In addition, since it is not necessary to distribute the S bits and the P bits to the two interleavers in a specific ratio, the transmitter does not require the distributor 212.

Third Operation (Receiver)

An operation of the receiver using the asymmetric coding rate and the interleavers with a variable length will be described in detail below. Data received from the transmitter is provided to the demodulator 310 where the received data is demodulated in coded bits according to a demodulation mode corresponding to the modulation mode used by the modulator 220 of the transmitter. The demodulated coded bits from the demodulator 310 are provided in series to the S/P converter 312, and the S/P converter 312 outputs the received coded bits in parallel. When the transmitter uses the asymmetric coding rate and the interleavers with a variable length, the S/P converter 312 by pre-arrangement will recognize the varying length. Thus, the S/P converter 312 outputs as many coded bits as a length of the first interleaver 214 in the transmitter to the first deinterleaver 314, and outputs as many coded bits as a length of the second interleaver 216 in the transmitter to the second deinterleaver 316.

When the modulator 220 of the transmitter uses 16QAM modulation, the S/P converter 312 outputs the first 3 bits to the first deinterleaver 314 and the next 1 bits to the second deinterleaver 316. However, when the modulator 220 of the transmitter uses 64QAM modulation, the S/P converter 312 divides the coded bits from the demodulator 310 into a series output of S bits and P bits according to a ratio of the S bits and the P bits used by the P/S converter 218 of the transmitter. The ratio can be determined based on a ratio of a length of the first interleaver 214 to a length of the second interleaver 216 of the transmitter.

For example, when the P/S converter 218 of the transmitter has used 4:2, 5:1, 4:2, and 5:1 ratios of the S bits to the P bits, i.e., ratios of the length of the first interleaver 214 to the length of the second interleaver 216, the S/P converter 312 outputs the first 4 bits to the first deinterleaver 314 and the next 2 bits to the second deinterleaver 316, in first and third processes. In second and fourth processes, the S/P converter 312 outputs the first 5 bits to the first deinterleaver 314 and the next 1 bit to the second deinterleaver 316.

The coded bits from the S/P converter 312 are classified into two bit groups, and the classified bit groups are provided to the first and second deinterleavers 314 and 316, where the bit groups are subject to deinterleaving. The deinterleaving operations of the first and second deinterleavers 314 and 316 correspond to the interleaving operations performed by the first and second interleavers 214 and 216 of the transmitter. That is, the first and second deinterleavers 314 and 316 perform deinterleaving according to the interleaving pattern performed by the first and second interleavers 214 and 216 of the transmitter.

The deinterleaved coded bits from the first and second deinterleavers 314 and 316, previously divided into the S bits and the P bits by the S/P converter 312, are provided to the decoder 320 where the coded bits are decoded into desired received bits according to a predetermined decoding method. For the predetermined decoding method, a method for receiving S bits and P bits and then decoding the S bits is used. The decoding method is determined based on the encoding method of the transmitter.

Second Embodiment

Figure 4:
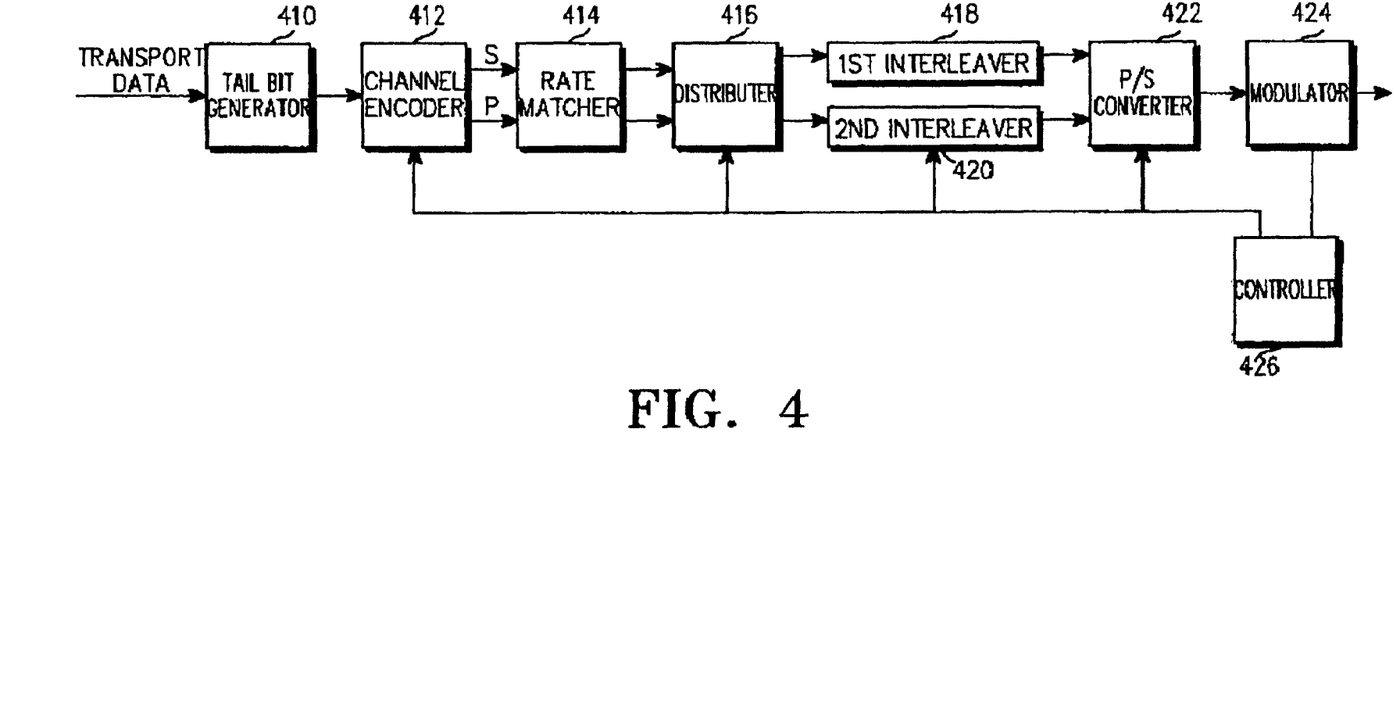
FIG. 4 illustrates a structure of a transmitter in a CDMA mobile communication system according to a second embodiment of the present invention.

FIG. 4 illustrates a structure of a transmitter in an HSDPA mobile communication system according to a second embodiment of the present invention. Referring to FIG. 4, a tail bit generator 410 receives transport data, and adds associated tail bits to the received transport data. A channel encoder 412, under the control of a controller 426, encodes the tail bits-added data received from the tail bit generator 410 using a predetermined code. The predetermined code refers to a code for outputting transport bits and error control bits of the transport bits. For example, the transport bits are systematic bits (S), and the error control bits are parity bits (P). The predetermined code includes a turbo code and a systematic convolutional code, as mentioned above.

A rate matcher 414 performs rate matching by repeating and puncturing the coded bits from the channel encoder 412. A distributor 416, under the control of the controller 426, receives the systematic bits and the parity bits from the rate matcher 414, and distributes the systematic bits and the parity bits to a plurality of interleavers.

First and second interleavers 418 and 420 receive the coded bits from the distributor 416, and interleave the received coded bits. The coded bits may be the systematic bits, the parity bits, or a mixture of the systematic bits and the parity bits. When the received coded bits are the mixed bits of the systematic bits and the parity bits, the distributor 416 is essential. In this case, an interleaver receiving the mixed bits of the systematic bits and the parity bits rearranges the coded bits such that the systematic bits having higher priority always exist in specific positions, before interleaving. This assists the receiver in performing a decoding operation, and the transmitter pre-notifies the receiver of the specific positions of the systematic bits. When the first and second interleavers 418 and 420 have a variable length, they are controlled by the controller 426. That is, when the first and second interleavers 418 and 420 have a variable length, the lengths of the first and second interleavers 418 and 420 are determined by the controller 426.

A parallel-to-serial (P/S) converter 422, under the control of the controller 426, receives in parallel the interleaved coded bits output from the first interleaver 418 and the interleaved coded bits output from the second interleaver 420, and outputs the received coded bits in series. For example, when the coded bits having the higher priority are interleaved by the first interleaver 418 and the coded bits having the lower priority are interleaved by the second interleaver 420, the P/S converter 422 first outputs the coded bits received from the first interleaver 418 and then outputs the coded bits received from the second interleaver 420. This is to map the systematic bits having the higher priority to the bit positions having the higher reliability in a succeeding modulation process.

A modulator 424 symbol-maps the coded bits from the P/S converter 422 according to a predetermined symbol pattern, and then the symbol-mapped coded bits are transmitted to the receiver. For example, when the modulator 424 uses the 16QAM modulation, the coded bits are subject to symbol mapping according to a symbol pattern [H,H,L,L]. However, when the modulator 424 uses the 64QAM modulation, the coded bits are subject to symbol mapping according to a symbol pattern [H,H,M,M,L,L].

The controller 426 controls the overall operation of the transmitter according to the second embodiment of the present invention. First, the controller 426 determines a coding rate and a modulation mode to be used in the current radio channel state. The controller 426 controls the coding rate of the channel encoder (or turbo encoder) 412 based on the determined coding rate to be used, and controls the modulator 424 based on the determined modulation mode. In addition, the controller 426 controls a distribution pattern of the distributor 416 based on the determined coding rate and the determined modulation mode. For example, when the plurality of interleavers include the two interleavers 418 and 420, the controller 426 controls the distributor 416 to distribute the systematic bits and the parity bits into two bit groups (bit streams) having the same number of bits. One of the two bit groups is provided to the first interleaver 418, and the other bit group is provided to the second interleaver 420. If the plurality of interleavers include 3 interleavers, the controller 426 controls the distributor 416 to distribute the systematic bits and the parity bits into three bit groups. However, when the transmitter uses the symmetric coding rate such as ½ coding rate, the distributor 416 is not essential in this embodiment. The reason is because when the ½ symmetric coding rate is used, the number of systematic bits is identical to the number of parity bits, and thus the systematic bits are provided to the first interleaver 418 and the parity bits are provided to the second interleaver 420. This is equally applied even when the first and second interleavers 418 and 420 support a variable length, although they use an asymmetric coding rate such as ¾ coding rate. That is, the distributor 416 is essential only when the first and second interleavers 418 and 420 support the asymmetric coding rate and the fixed length.

Third Embodiment

Figure 5:
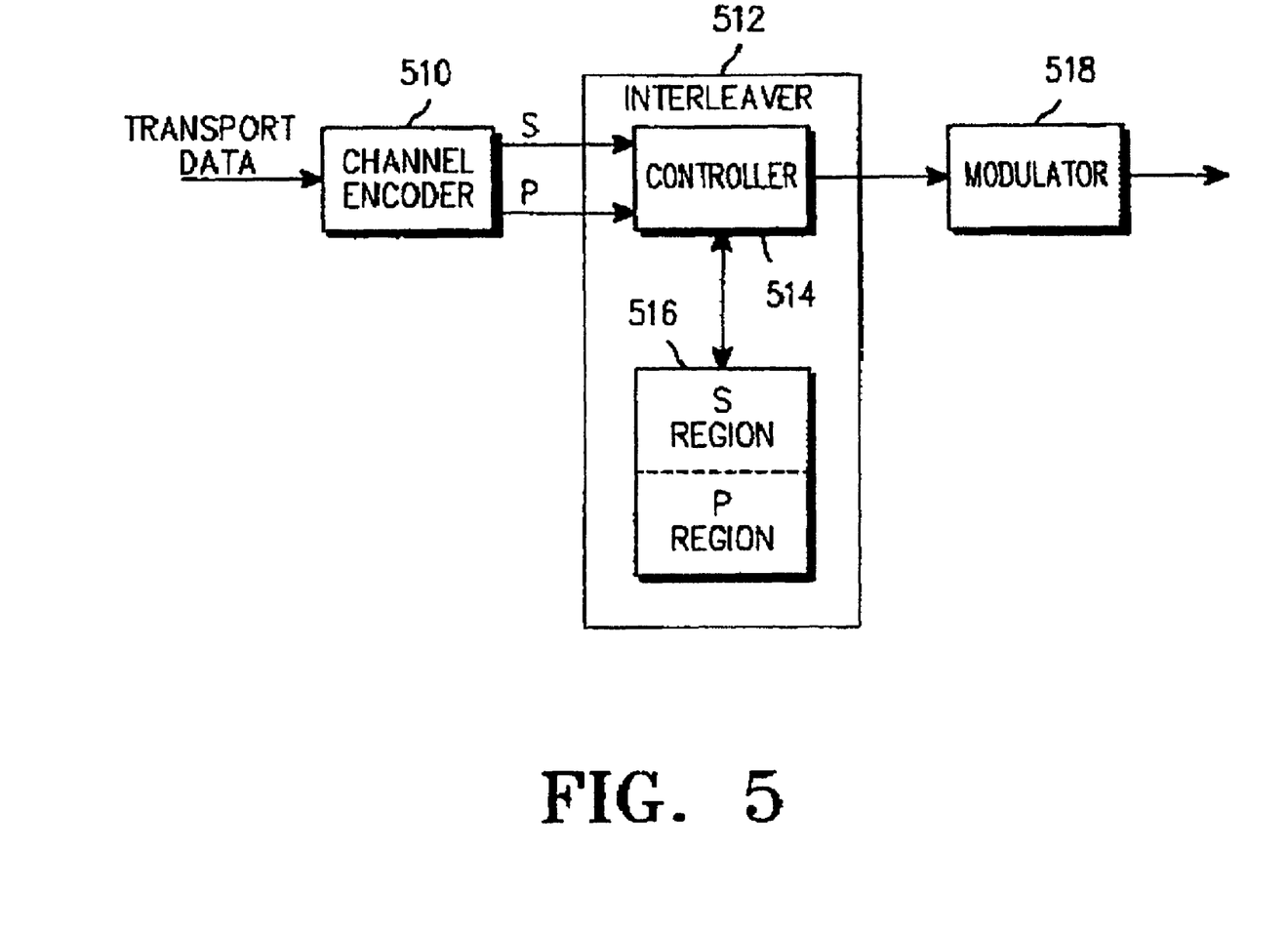
FIG. 5 illustrates a structure of a transmitter in a CDMA mobile communication system according to a third embodiment of the present invention.

FIG. 5 illustrates a structure of a transmitter in a CDMA mobile communication system according to a third embodiment of the present invention. The transmitter of FIG. 5 outputs coded symbols in series by an interleaver without a separate P/S converter.

Referring to FIG. 5, transport data is provided to a channel encoder 510 where the received transport data is encoded by a predetermined code. That is, the channel encoder 510 outputs systematic bits (S bits), which are actual transport data, and parity bits (P bits) for error controlling of the transport data. The S bits and the P bits from the channel encoder 510 are provided to a controller 514 that is part of an interleaver 512. The controller 514 assigns a predetermined address to the S bits provided from the channel encoder 510, and sequentially stores the S bits in an S region of a memory 516. In addition, the controller 514 assigns a predetermined address to the P bits provided from the channel encoder 510, and sequentially stores the P bits in a P region of the memory 516.

Further, the controller 514 performs a control operation of transporting the S bits and the P bits stored in the memory 516. Specifically, the controller 514 analyzes the coding rate used by the channel encoder 510 to transmit the S bits and the P bits stored in the memory 516, and also analyzes the modulation mode to be used by a modulator 518. After determining the coding rate and the modulation mode through the analysis, the controller 514 reads the S bits and the P bits stored in the memory 516 based on the determined coding rate and modulation mode.

For example, when the determined coding rate is a symmetric coding rate ½ and the determined modulation mode is 16QAM or 64QAM, the controller 514 repeatedly alternately accesses the S region and the P region of the memory 516 in the same ratio, and outputs the same number of the S bits and the P bits. That is, the controller 514 first reads 2 (or 3) S bits by accessing the S region, and then reads 2 (or 3) P bits by accessing the P region. In the case of 2 bits, the 2 S bits and the 2 P bits output from the controller 514 are provided to the modulator 518 where the S bits and the P bits are subject to 16QAM modulation. Specifically, the 2 S bits are mapped to the 2 H-bit positions in the symbol pattern [H,H,L,L] defined for the 16QAM modulation, and the 2 P bits are mapped to the 2 L-bit positions in the symbol pattern.

However, when the determined coding rate is a ¾ asymmetric coding rate and the determined modulation mode is 16QAM, the controller 514 outputs the S bits and the P bits in a ratio of 3:1 by accessing the P region of the memory 516 once while accessing the S region 3 times. In this case, the 3 S bits and the 1 P bit output from the controller 514 are provided to the modulator 518 where the S bits and the P bit are subject to 16QAM modulation. Specifically, the 2 S bits are mapped to the 2 H-bit positions in the symbol pattern [H,H,L,L] defined for the 16QAM modulation, and the remaining 1 S bit and the 1 P bit are mapped to the 2 L-bit positions in the symbol pattern.

Finally, when the determined coding rate is the ¾ asymmetric coding rate and the determined modulation mode is 64QAM, the controller 514 outputs the S bits and the P bits by accessing the S region and the P region of the memory 516 in a predetermined ratio. Here, the total access number of the memory 516 is a value that can be divided by 2 (for QPSK), 3 (for 8PSK), 4 (for 16QAM) and 6 (for 64QAM). As an example of this condition, when the total access number $A_{tot}$ is 144 bits, the following condition is satisfied.

$$A_{tot} = A_{sys} + A_{par} = 144 \quad (2)$$

where $A_{sys}$ represents the number of accesses to the S region and $A_{par}$ represents the number of accesses to the P region.

In the 64QAM modulation mode, since one symbol is comprised of 6 bits and $A_{sys}:A_{par}=3:1$, 9 S bits and 3 P bits are required in constructing 2 symbols (12 bits). That is, the controller 514 should theoretically output 4.5 S bits and 1.5 P bits per symbol. However, because the bit numbers are not an integer, the controller 514 changes the number of output bits in a symbol unit. For example, the controller 514 first outputs 4 S bits and 2 P bits, and then outputs 5 S bits and 1 P bit.

In this case, the S bits and the P bits output from the controller 514 are provided to the modulator 518, where the provided bits are subject to 64QAM modulation. When the 4 S bits and the 2 P bits are provided from the controller 514, the modulator 518 maps the first 2 S bits to the 2 H-bit positions in the symbol pattern [H,H,M,M,L,L] defined for the 64QAM modulation, maps the remaining 2 S bits to the 2 M-bit positions in the symbol pattern, and maps the 2 P bits to the 2 L-bit positions in the symbol pattern. Meanwhile, when the 5 S bits and the 1 P bit are provided from the controller 514, the modulator 518 maps the first 2 S bits to the 2 H-bit positions in the symbol pattern [H,H,M,M,L,L] defined for the 64QAM modulation, maps the next 2 S bits to the 2 M-bit positions in the symbol pattern, and maps the remaining 1 S bit and the 1 P bit to the 2 L-bit positions in the symbol pattern.

Figure 7:
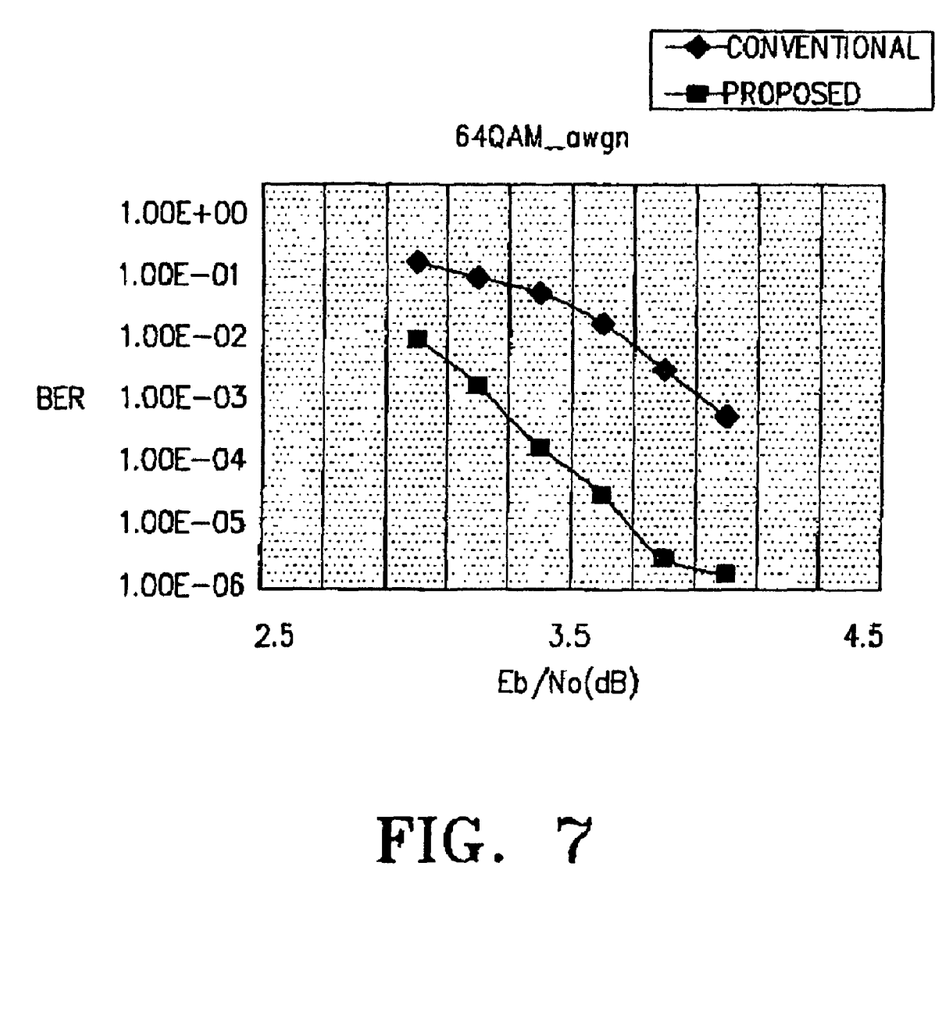
FIG. 7 illustrates simulation results obtained when the simulation is performed using 64QAM modulation according to an embodiment of the present invention.
Figure 8:
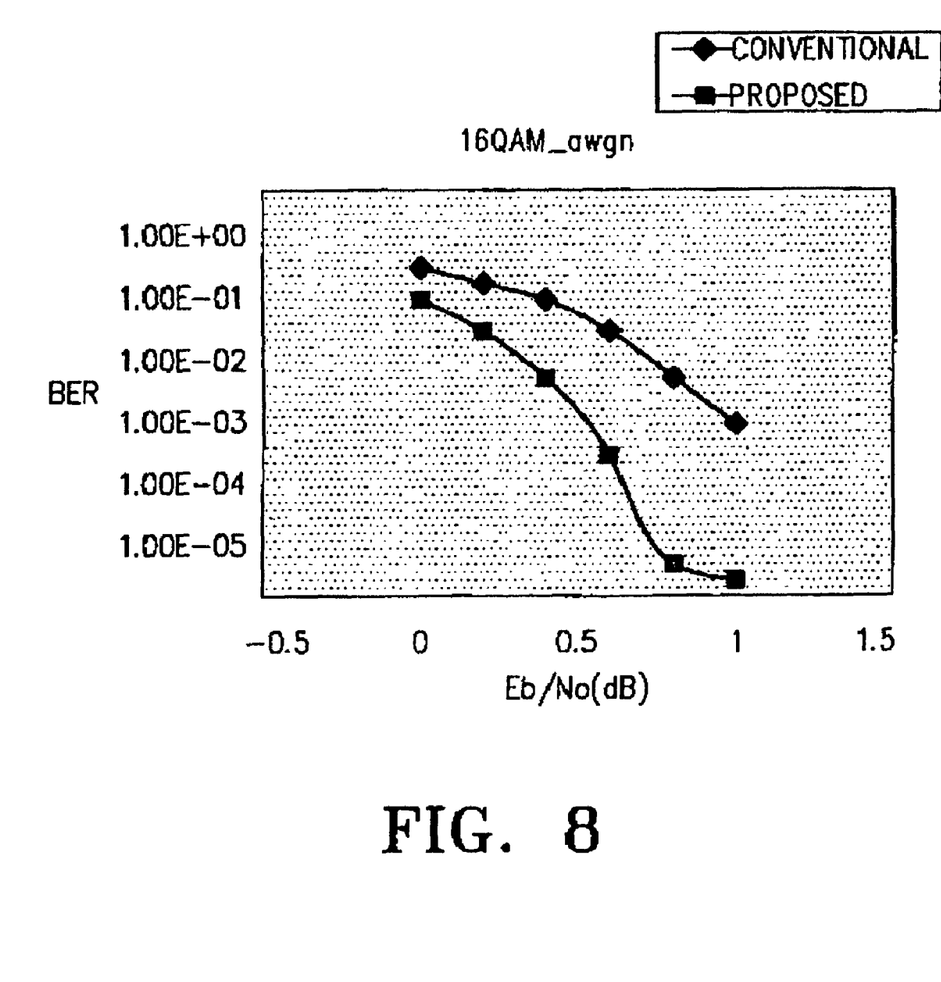
FIG. 8 illustrates simulation results obtained when the simulation is performed using 16QAM modulation according to an embodiment of the present invention.

FIG. 7 illustrates simulation results obtained when the simulation is performed using an encoder and a decoder both supporting 64QAM modulation according to an embodiment of the present invention. FIG. 8 illustrates simulation results obtained when the simulation is performed using an encoder and a decoder both supporting 16QAM modulation according to an embodiment of the present invention. FIGS. 7 and 8 prove the effects of the invention. While the simulations were performed in a controlled setting, they are sufficient to show the beneficial effects of the invention. The simulation results of FIGS. 7 and 8 show a comparison between a bit error rate (BER) and a bit-to-noise ratio ($E_b/N_o$). According to the simulation results, the invention shows an increase in a gain of about 0.4 dB or over for both the 16QAM and the 64QAM as compared with the prior art. The simulation results of FIGS. 7 and 8 were obtained in the simulation condition where AWGN (Additive White Gaussian Noise) exists, turbo encoder input block size of 24,3043 bits, coding rate of ½, and the interleavers with a fixed length are used.

As described above, the present invention maps the bits having higher priority to the bit positions having higher reliability, thereby obtaining superior transportation efficiency in the technical fields of error control coding, modulation/demodulation and data transportation. Further, the invention can be applied not only to the transceiver of the existing wired/wireless communication system, but also to the transceiver of the $3^{rd}$ generation mobile communication system, IMT-2000 system, thus improving the overall system performance. This is achieved by modulating (mapping) the bits having higher priority with the bits having higher reliability, which are less affected by the noises and environments. That is, compared with the conventional system, the system according to the present invention has a lower bit error rate (BER) and improved system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data processing method in a mobile communication system, for processing data comprised of bits having a higher priority and bits having a lower priority, generated by an encoder, comprising the steps of:
   separately interleaving the bits having higher priority and the bits having lower priority, for all code rates and modulation schemes, by varying a number of bits having higher priority and bits having lower priority to be separately interleaved; and
   mapping the interleaved bits having higher priority to a first bit part and the interleaved bits having lower priority to a second bit part,
   wherein a mapped symbol is comprised of the first bit part having higher reliability and the second bit part having lower reliability.

2. The method as claimed in claim 1, further comprising distributing the bits having higher priority and the bits having lower priority based on a ratio of the bits having higher priority to the bits having lower priority, such that the bits having the higher priority are equal in number to the bits having lower priority.

3. The method as claimed in claim 1, wherein the interleaving step comprises first interleaving the bits having higher priority and second interleaving the bits having lower priority.

4. The method as claimed in claim 1, wherein the bits having higher priority are systematic bits.

5. The method as claimed in claim 4, wherein the bits having lower priority are parity bits.

6. The method as claimed in claim 2, wherein the ratio of the bits having higher priority to the bits having lower priority is ½, when a coding rate of the encoder is ½.

7. The method as claimed in claim 2, wherein the ratio of the bits having higher priority to the bits having lower priority is ¾, when a coding rate of the encoder is ¾.

8. The method as claimed in claim 1, further comprising determining the number of bit streams mapped to one symbol according to a modulation mode based on a radio channel state.

9. A data processing apparatus in a mobile communication system, for processing data comprised of bits having higher priority and bits having lower priority, generated by an encoder, comprising:
   an interleave unit for separately interleaving the bits having higher priority and the bits having lower priority, for all code rates and modulation schemes, by varying a number of bits having higher priority and bits having lower priority to be separately interleaved; and
   a modulator for mapping the interleaved bits having higher priority to a first bit part and the interleaved bits having lower priority to a second bit part,
   wherein a symbol output from the modulator is comprised of the first bit part having higher reliability and the second bit part having lower reliability.

10. The apparatus as claimed in claim 9, further comprising a distributor for receiving the bits having higher priority and the bits having lower priority, distributing the received bits into a first bit stream comprised of the bits having higher priority and a second bit stream comprised of the bits having higher priority excluded from the first bit stream and the bits having lower priority, such that the bits of the first bit stream are equal in number to the bits of the second bit stream, outputting the first bit stream to the interleave unit and outputting the second bit stream to the interleave unit.

11. The apparatus as claimed in claim 9, wherein the interleave unit comprises first interleaver for interleaving the bits having higher priority and second interleaver for interleaving the bits having lower priority.

12. The apparatus as claimed in claim 9, further comprising a controller for determining a modulation mode according to a radio channel state, and controlling the number of bits of bit stream mapped to one symbol based on the determined modulation mode.

13. The apparatus as claimed in claim 9, wherein the bits having higher priority are systematic bits.

14. The apparatus as claimed in claim 13, wherein the bits having lower priority are parity bits.

15. The apparatus as claimed in claim 10, wherein a ratio of the bits having higher priority to the bits having lower priority is ½, when a coding rate of the encoder is ½.

16. The apparatus as claimed in claim 10, wherein a ratio of the bits having higher priority to the bits having lower priority is ¾, when a coding rate of the encoder is ¾.

17. A data processing apparatus in a mobile communication system, for transforming data comprised of bits having higher priority and bits having lower priority, generated by an encoder at a predetermined coding rate, comprising:

a memory physically divided into a first region and a second region, for storing the bits having higher priority in the first region and the bits having lower priority in the second region;

a controller for determining a ratio of the bits having higher priority to the bits having lower priority based on a coding rate of the encoder and a modulation mode of a modulator, for all code rates and modulation modes, by varying a number of bits having higher priority and bits having lower priority to be separately interleaved, reading the bits having higher priority and the bits having lower priority from the first region and the second region according to a predetermined interleaving pattern so as to secure the determined ratio; and the modulator for mapping the read bits having higher priority to a first bit part and the read bits having lower priority to a second bit part, in mapping a bit stream comprised of at least 3 bits to one symbol, the bit stream is comprised of the first bit part having higher reliability and the second bit part having lower reliability.

18. The data processing apparatus as claimed in claim 17, wherein the bits having higher priority are systematic bits.

19. The data processing apparatus as claimed in claim 18, wherein the bits having lower priority are parity bits.

20. A method for processing data represented with bits generated by an encoder, using a memory physically divided into a first region and a second region and a modulator which generates a symbol by mapping the bits to a first bit part having high reliability and a second bit part having lower reliability according to priorities of the bits, comprising the steps of:

storing high priority bits in the first region and low priority bits in the second region;

interleaving the high and low priority bits, respectively;

determining a ratio of the high priority bits to the low priority bits based on a coding rate of the encoder and a modulation mode of the modulator;

determining a number of the interleaved high priority bits and a number of the interleaved low priority bits to be mapped to the symbol, for all code rates and modulation modes, by varying a number of bits having higher priority and bits having lower priority to be separately interleaved;

reading the high priority bits from the first region in consideration of an interleaved pattern of the high priority bits;

reading the low priority bits from the second region in consideration of an interleaved pattern of the low priority bits; and modulating the high priority bits and the low priority bits such that the high priority bits are situated in the first bit part and the lower priority bits are situated in the second bit part.

21. The method as claimed in claim 20, wherein the high priority bits are systematic bits.

22. The method as claimed in claim 21, wherein the low priority bits are parity bits.

* * * * *